(12) United States Patent
PaPasodero

(10) Patent No.: US 7,451,897 B2
(45) Date of Patent: Nov. 18, 2008

(54) ATTACHMENT FOR A CONTAINER

(76) Inventor: Alex PaPasodero, 2 Shadow Brook La., Apt. 2, Milford, MA (US) 01757

( * ) Notice: Subject to any disclaimer, the term of this patent is extended or adjusted under 35 U.S.C. 154(b) by 392 days.

(21) Appl. No.: 11/184,583

(22) Filed: Jul. 19, 2005

(65) Prior Publication Data

US 2007/0017934 A1 Jan. 25, 2007

(51) Int. Cl.
*B67D 5/58* (2006.01)
(52) U.S. Cl. .................... 222/189.07; 222/570; 210/466
(58) Field of Classification Search ............ 222/189.07, 222/189.06, 565, 566, 572, 567, 570; 210/466, 210/467, 468
See application file for complete search history.

(56) References Cited

U.S. PATENT DOCUMENTS

| 272,924 | A |  | 2/1883 | Kersen |  |
|---|---|---|---|---|---|
| 761,342 | A |  | 5/1904 | Westerbeck |  |
| 1,965,356 | A |  | 7/1934 | Rittenhouse |  |
| 2,550,568 | A |  | 4/1951 | Kersh |  |
| 2,840,239 | A | * | 6/1958 | Wethammer | ................ 210/467 |
| 3,926,348 | A | * | 12/1975 | Lutzker | .................. 222/189.07 |
| 3,987,943 | A |  | 10/1976 | Richmond, Jr. |  |
| 4,034,901 | A |  | 7/1977 | Kirk |  |
| 4,230,238 | A |  | 10/1980 | Wilson |  |
| 4,310,418 | A |  | 1/1982 | Busbey |  |
| 4,605,225 | A | * | 8/1986 | Zimmermann | .............. 222/566 |
| 4,893,723 | A |  | 1/1990 | Seabolt |  |
| 5,564,622 | A |  | 10/1996 | Wald |  |
| 5,720,412 | A | * | 2/1998 | Ficken | ........................ 220/703 |

* cited by examiner

*Primary Examiner*—Kevin P. Shaver
*Assistant Examiner*—Hyea J Choi
(74) *Attorney, Agent, or Firm*—Kriegsman & Kriegsman

(57) ABSTRACT

An attachment is designed for removable mounting on various types of conventional cookware containers, such as cooking pots, mixing bowls or frying pans. The attachment includes a spout which serves to assist in pouring food products out from the container. The attachment also includes a cover disposed partially across the top surface of the spout, the cover serving to minimize the splashing of the food product during a pouring operation. The attachment additionally includes inner and outer support members which together retain the attachment in its mounted position on the container. With the attachment mounted on the container, the inner and outer support members conform tightly against and frictionally engage the inner and outer surfaces, respectively, of the sidewall of the container.

12 Claims, 6 Drawing Sheets

ATTACHMENT FOR A CONTAINER

BACKGROUND OF THE INVENTION

The present invention relates generally to the preparation, mixing and cooking of foods and more particularly to the containers used during the preparation, mixing and cooking of foods.

Various types of containers are commonly used to prepare, mix and cook foods. The containers are often constructed out of a conductive material, such as metal. Accordingly, by subjecting the container to heat (e.g., using a stove), the ingredients retained within the container are similarly subjected to heat. It is in this manner that most types of foods are traditionally heated.

Containers used to prepare, mix and cook foods often come in a wide variety of different shapes and styles. Examples of different types of containers used in the cooking industry include, inter alia, pots, pans and bowls.

Most containers which are used for preparing, mixing and/or cooking food products are shaped to include a substantially flat, substantially circular bottom surface and a single, continuous sidewall which is integrally formed and extends orthogonally away from the outer periphery of the circular bottom surface. Together, the bottom surface and sidewall define a generally cylindrical cavity which is sized and shaped to retain the particular food products.

The particular design of the above-described containers inherently presents a notable drawback to the user. Specifically, the free end of the upwardly extending sidewall is typically formed in the shape of a ring. Accordingly, when the container is manipulated (e.g., tilted or pivoted) to pour out the materials contained therein, the materials exit the container as wide stream which is very difficult to control. As a result, these types of containers often make a considerable mess when used for pouring.

In response to the above-described shortcoming, some presently available containers that are used to prepare, mix and cook food products are shaped to include a small spout at a location along the free end of its sidewall. Accordingly, when such a container is used to pour out a product retained therein, the spout serves as a funnel for the exiting product, thereby providing the user with greater control and accuracy during the pouring process, which is highly desirable.

For example, in U.S. Pat. No. 4,310,418 to S. Busbey there is shown a cooking pot with a pour spout. The pot is additionally provided with a lid containing a depending annular flange which fits within the pot against the inside surface of the pot. The flange contains a solid portion which extends for a distance sufficient to cover the spout opening in the pot and also includes one or more areas having various size slots or holes formed therein. In this manner, the lid can be turned on the pot for selectively closing off the drainage spout or disposing one set of slots or holes across the spout to act as a sieve for draining liquid from the pot.

Although containers provided with an integrated spout are well-known and widely used in commerce, it has been found that these types of containers suffer from a couple notable shortcomings.

As a first shortcoming, containers provided with an integrated spout fail to provide the owners of the more conventional containers (i.e., the containers which do not include an integrated spout) with a retrograde means for modifying their existing containers to allow for greater control during pouring operations. As a result, the owners of containers which do not integrally include a spout are required to replace all of their existing containers, which can be considerably expensive.

As a second shortcoming, containers which are provided with an integrated spout require a more complex manufacturing process. As a result, containers which include an integrated spout are often considerably more expensive than containers which do not include an integrated spout.

As a third shortcoming, containers which are provided with an integrated spout will not be air-tight when a cover or lide is seated on top of the container.

SUMMARY OF THE INVENTION

It is an object of the present invention to provide a novel attachment for a container designed to retain food products.

It is another object of the present invention to provide a novel attachment of the type described above which facilitates in the pouring of the food products from the container.

It is yet another object of the present invention to provide an attachment of the type described above which is removably mounted on the container.

It is yet still another object of the present invention to provide an attachment of the type described above which is designed to mount on a wide variety of different containers that are commonly used to retain food products.

It is even still another object of the present invention to provide an attachment of the type described above which includes a limited number of parts, which is easy to use and which is inexpensive to manufacture.

Therefore, according to one feature of the present invention, there is provided an attachment for a container, the container comprising a bottom surface and a sidewall, the sidewall having an inner surface and an outer surface, the attachment comprising (a) a spout, and (b) inner and outer support members coupled to the spout, (c) wherein, with the attachment mounted on the container, the inner and outer support members are disposed on opposite sides of the sidewall for the container.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
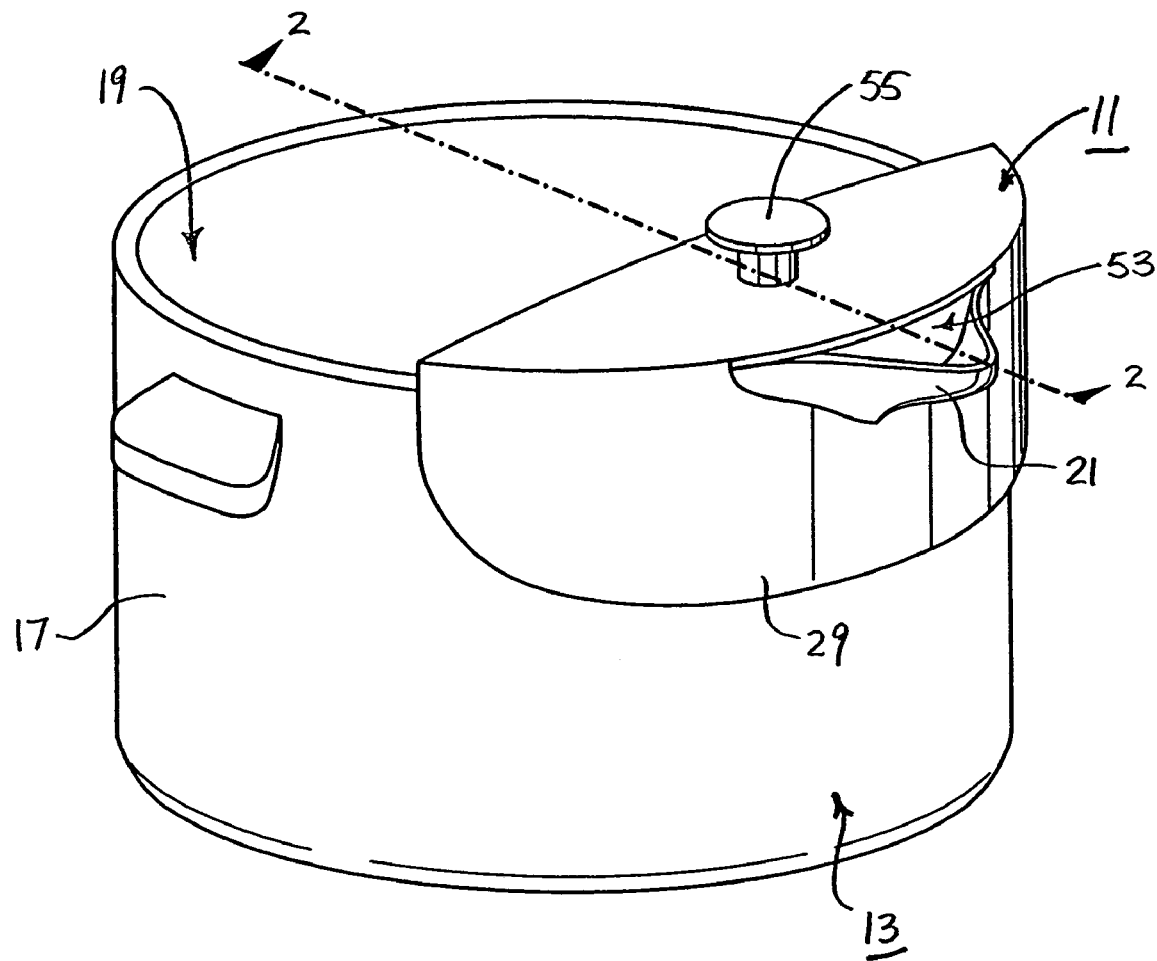
FIG. 1 is a perspective view of a first embodiment of an attachment for a container, the attachment being constructed according to the teachings of the present invention, the attachment being shown mounted on a container.
Figure 2:
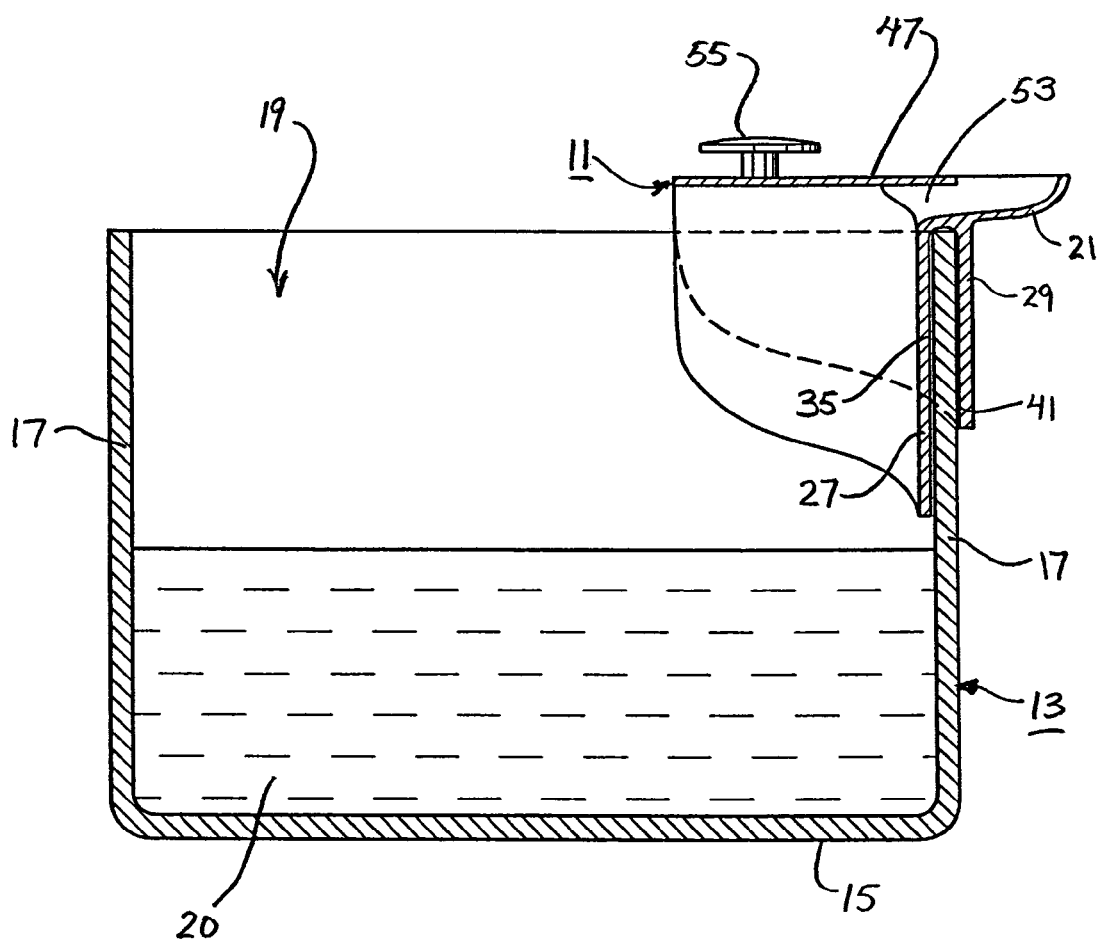
FIG. 2 is a side section view of the attachment and container shown in FIG. 1 taken along lines 2-2, the container being shown with a liquid-based food product retained therein.

Referring now to FIGS. 1 and 2, there is shown a first embodiment of an attachment for a container, the attachment being constructed according to the teachings of the present invention and identified generally by reference numeral 11. Attachment 11 is shown mounted on a container 13. As will be described further below, attachment 11 is designed to facilitate in the pouring of food products out from container 13.

Container 13 is represented herein as a conventional cooking pot which includes a substantially flat and substantially circular bottom surface 15 and a single, continuous sidewall 17 which is integrally formed and extends orthogonally away from the outer periphery of circular bottom surface 15. Together, bottom surface 15 and sidewall 17 define a generally cylindrical interior cavity 19 which is sized and shaped to retain a primarily liquid-based food product 20.

However, it is to be understood that container 13 is not limited to a cooking pot. Rather, it is to be understood that container 13 represents any conventional receptacle which is commonly used to either prepare, mix and/or cook food products without departing from the spirit of the present invention. Examples of alternative types of containers with which attachment 11 may be used include, but are not limited to, mixing bowls and frying pans.

Figure 3:
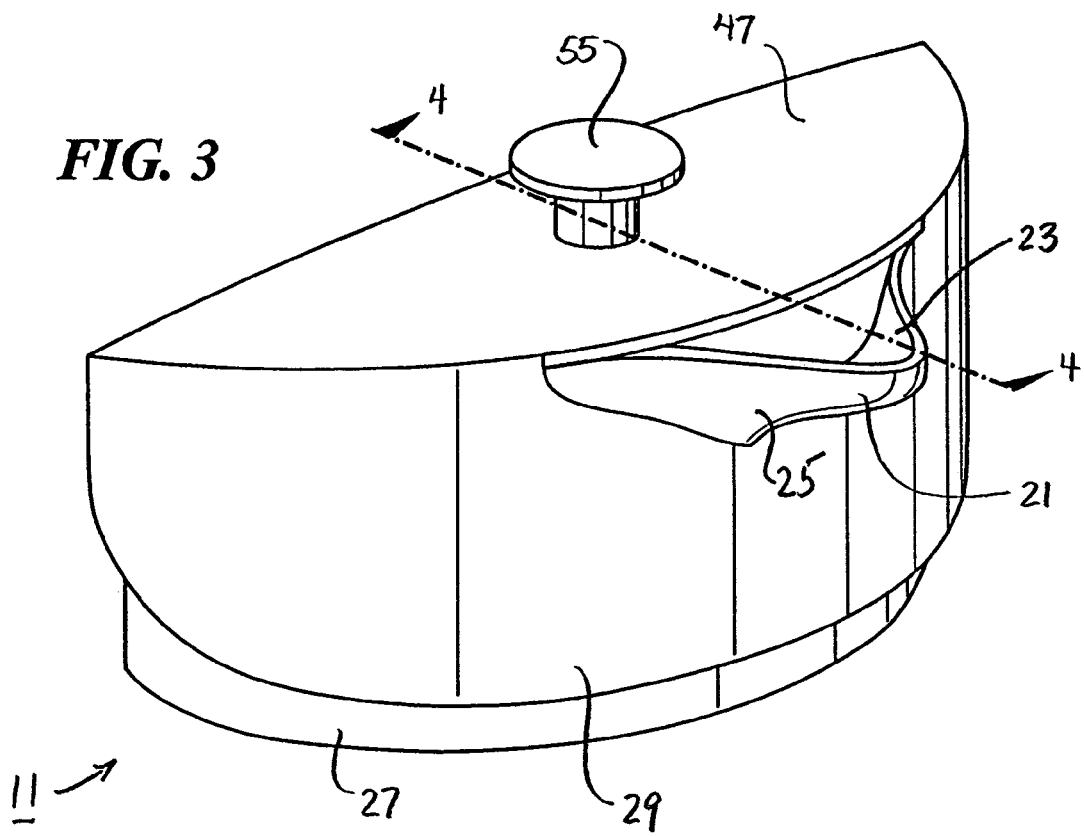
FIG. 3 is an enlarged perspective view of the attachment shown in FIG. 1.
Figure 4:
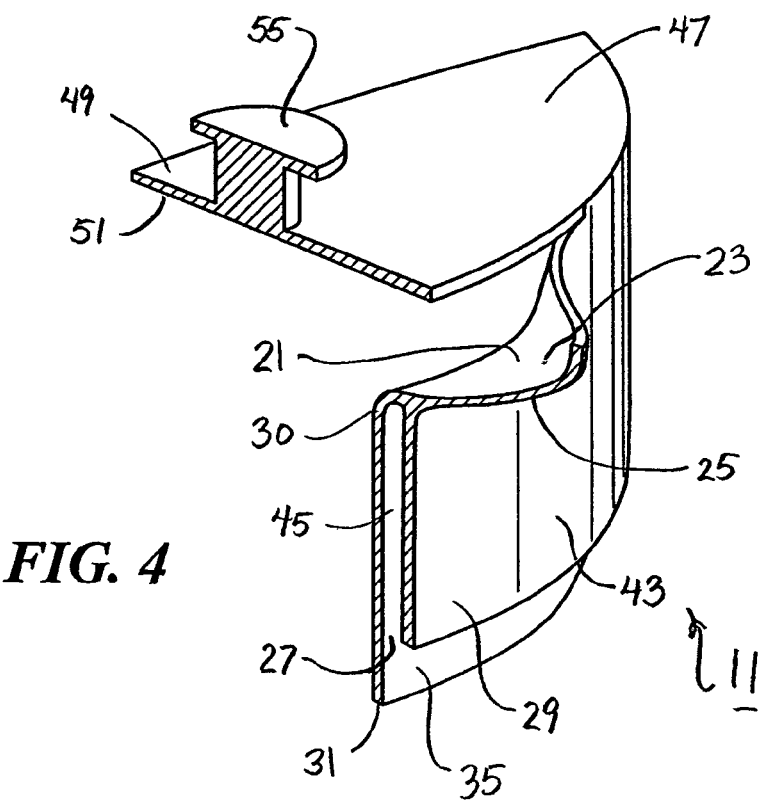
FIG. 4 is a fragmentary perspective view of the attachment shown in FIG. 3 taken along lines 4-4.
Figure 5:
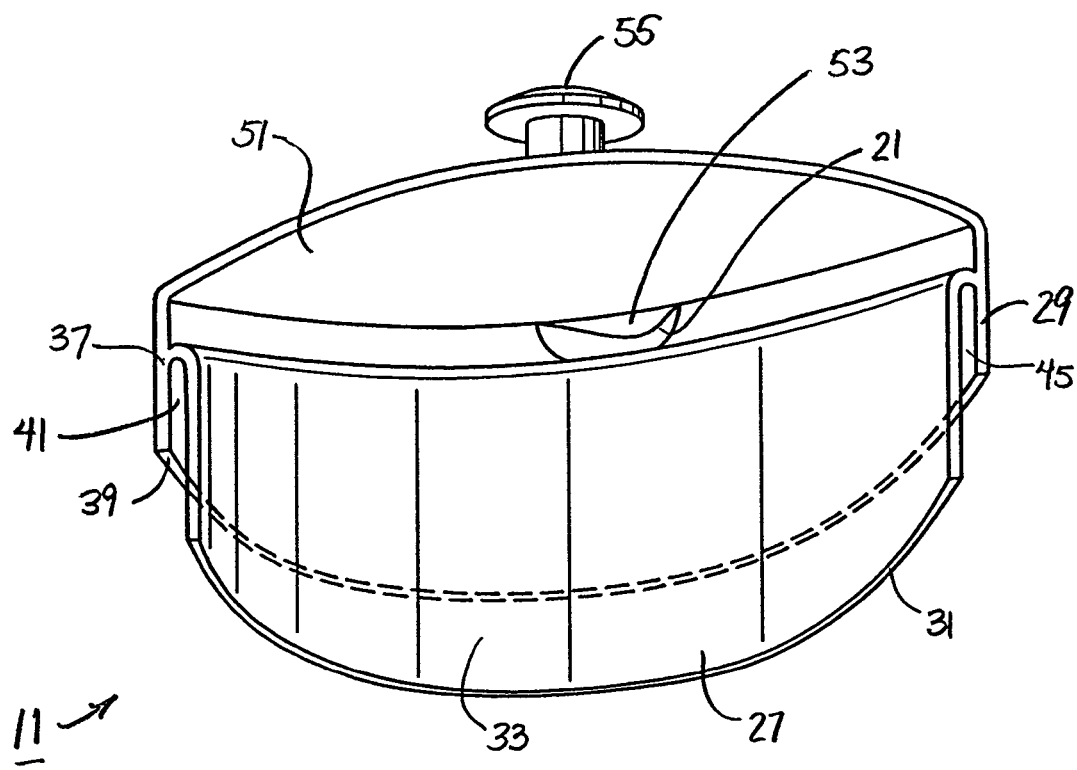
FIG. 5 is an enlarged rear perspective view of the attachment shown in FIG. 3.

Referring now to FIGS. 3-5, attachment 11 is preferably a unitary device which is constructed out of a durable, flexible and washable material, such as rubber or plastic. However, it is to be understood that, because selected parts of attachment 11 may require varying levels of rigidity, different portions of attachment 11 may be constructed out of different types of materials without departing from the spirit of the present invention.

Attachment 11 includes a substantially narrow and concave spout 21 which includes a top surface 23 and a bottom surface 25. As will be described further in detail below, spout 15 enables food products 20 that are retained within container 13 to be poured out as a narrow, controlled stream, which is a principal object of the present invention.

Attachment 11 additionally includes inner and outer support members 27 and 29 which together serve as a means for securely retaining attachment 11 in a mounted position on sidewall 17 of container 13.

Inner support member 27 is preferably constructed as a thin, flexible wing which has a curved contour along its length, inner support member 27 including a fixed end 30 coupled to spout 21, a free end 31, an inner surface 33 and an outer surface 35. It should be noted that, with attachment 11 mounted on container 13, the curved flexible construction of inner support member 27 causes its outer surface 35 to substantially conform against and frictionally engage the inner surface of sidewall 17, as seen most clearly in FIG. 2.

Similarly, outer support member 29 is preferably constructed as a thin, flexible wing which has a curved contour along its length, outer support member 29 including a fixed end 37 coupled to spout 21, a free end 39, an inner surface 41 and an outer surface 43. It should be noted that, with attachment mounted on container 13, the curved flexible construction of outer support member 29 causes its inner surface 41 to substantially conform against and frictionally engage the outer surface of sidewall 17, as seen most clearly in FIG. 2.

Preferably, attachment 11 is constructed such that the majority of outer support member 29 is spaced slightly apart from inner support member 27. In this manner, a narrow groove 45 is defined between inner and outer support members 27 and 29 which is sized and shaped to receive a portion of sidewall 17 along its open top end. It is to be understood that the flexible nature of inner and outer support members 27 and 29 allows for the dimensions of groove 45 to be modified to allow attachment 11 to mount securely on a wide variety of differently sized, shaped and styled containers 13. However, it is to be understood that a mechanical device could be incorporated into attachment 11 to draw together the majority of the inner and outer support members 27 and 29 to the extent necessary to adequately secure attachment 11 in its mounted position on container 13, as will be described further in detail below.

Attachment 11 further comprises a cover 47 which extends over a portion of the top surface of spout 21; cover 47 including a top surface 49 and a bottom surface 51. As can be seen most clearly in FIG. 2, spout 21, cover 47 define a product delivery channel 53 which serves as the passageway, or funnel, through which product 20 is conveniently poured out from container 13.

Preferably, top surface 49 of cover 47 is shaped to include a knob-like handle 55. As can be appreciated, handle 55 is provided to facilitate handling of attachment 11.

In use, attachment 11 may be used in the following manner to facilitate in the pouring of food product 20 out from container 13. Specifically, utilizing handle 55, the user slides attachment 11 down over the free end of sidewall 17 such that inner support member 27 and outer support member 29 frictionally engage opposing sides of sidewall 17. In this manner, it is to be understood that attachment 11 is retained in its mounted position on container 13 (i.e., as represented in FIGS. 1 and 2).

In order pour food product 20 in a controlled manner, container 13 is tipped in the direction towards spout 21. As container 13 is pivoted, food product 20 is directed towards the product delivery channel 53. It should be noted that, because inner support member 27 conforms tightly against the inner surface of sidewall 17, none of the food product 20 becomes trapped therebetween, which is highly desirable. It should also be noted that, as container 13 is tipped for pouring, cover 47 serves a blocking device, or guard, for preventing the splashing or otherwise inadvertent spilling of food product 20 out from container 13, which is highly desirable.

Continued tipping of container 13 ultimately directs a flow of food product 20 into the product delivery channel 53 that is defined within attachment 11. Further tipping of container 13 eventually causes food product 20 to exit through spout 21 as a narrow and highly controllable stream, which is the principal object of the present invention.

Once an adequate supply of food product 20 has been dispensed, container 13 is returned to its original, upright orientation. Using handle 55, attachment 11 is withdrawn from container 13 and is preferably washed in preparation for future use. As can be appreciated, attachment 11 can be reused as needed on a wide variety of differently sized, shaped and styled containers, which is highly desirable.

As noted above, the particular design of attachment 11 allows for it to be mounted on a wide variety of differently sized, shaped and styled containers 13. Although the flexible nature of support members 27 and 29 allows for attachment 11 to be securely mounted on sidewall 17, it is to be understood that a mechanical device may be integrated into attachment 11 to enhance the strength of the engagement between attachment 11 and container 13.

As a first example, (not shown) one end of a threaded fastener may be fixedly mounted on inner support member 27 with the opposite end of the threaded fastener extending through a complementary threaded bore formed in outer support member 29. With a manually adjustable knob threadingly mounted on the free end of the fastener, it is to be understood that the rotation of the knob in one direction would serve to draw the majority of outer support member 29 in towards the majority of inner support member 27 and that the rotation of the knob in the opposite direction would serve to urge away the majority of outer support member 29 away from the majority of inner support member 27. In this manner, inner and outer support members 27 and 29 can be manually adjusted into tight conformity against the inner and outer surfaces, respectively, of sidewall 17.

Figure 6:
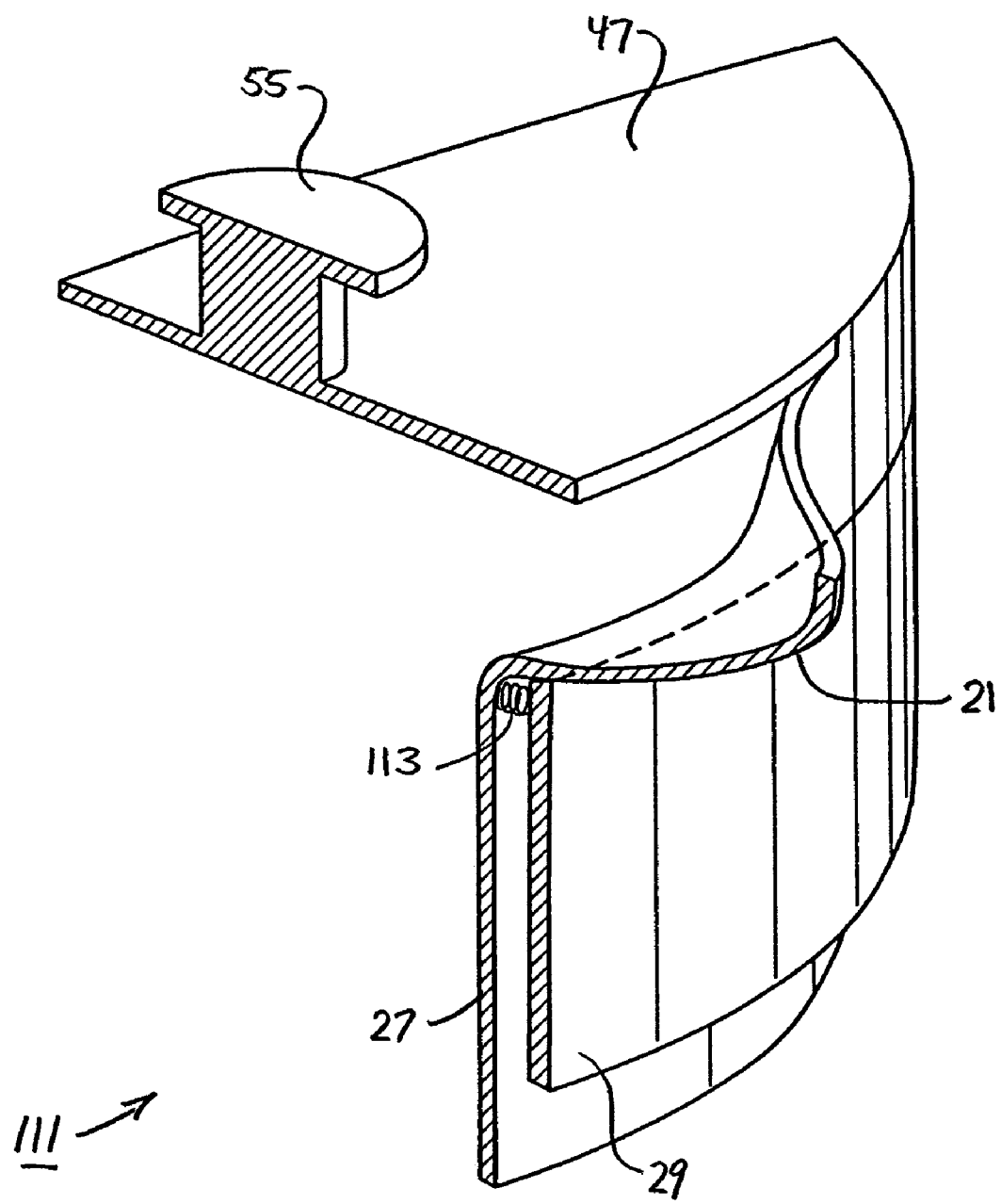
FIG. 6 is an enlarged fragmentary perspective view of a second embodiment of an attachment for a container, the attachment being constructed according to the teachings of the present invention.

As another example, a compression spring may be used to resiliently draw the inner and outer support members 27 and 29 together. Specifically, referring now to FIG. 6, there is shown a second embodiment of an attachment for a container, the attachment being constructed according to the teachings of the present invention and identified generally as reference numeral 111.

Attachment 111 is identical in all respects with attachment 11 with the one notable distinction being that attachment 111 additionally includes a compression spring 113 which extends between inner and outer support members 27 and 29, with one end of compression spring 113 being fixedly mounted within inner support member 27 and the opposite end of compression spring 113 being fixedly mounted within the outer support member 29.

Accordingly, it is to be understood that compression spring 113 serves to resiliently draw inner and outer support members 27 and 29 together. In order to mount attachment 111 onto container 13, inner and outer support members 27 and 29 are manually spaced apart from one another to the degree necessary for attachment 111 to be slidably mounted onto container 13. Once attachment 111 is mounted on container 13, the user withdraws the separation force applied onto inner and outer support members 27 and 29. In turn, compression spring 113 resiliently draws inner and outer support members 27 and 29 in towards one another and into frictional engagement against opposite sides of sidewall 17, which is highly desirable.

Figure 7:
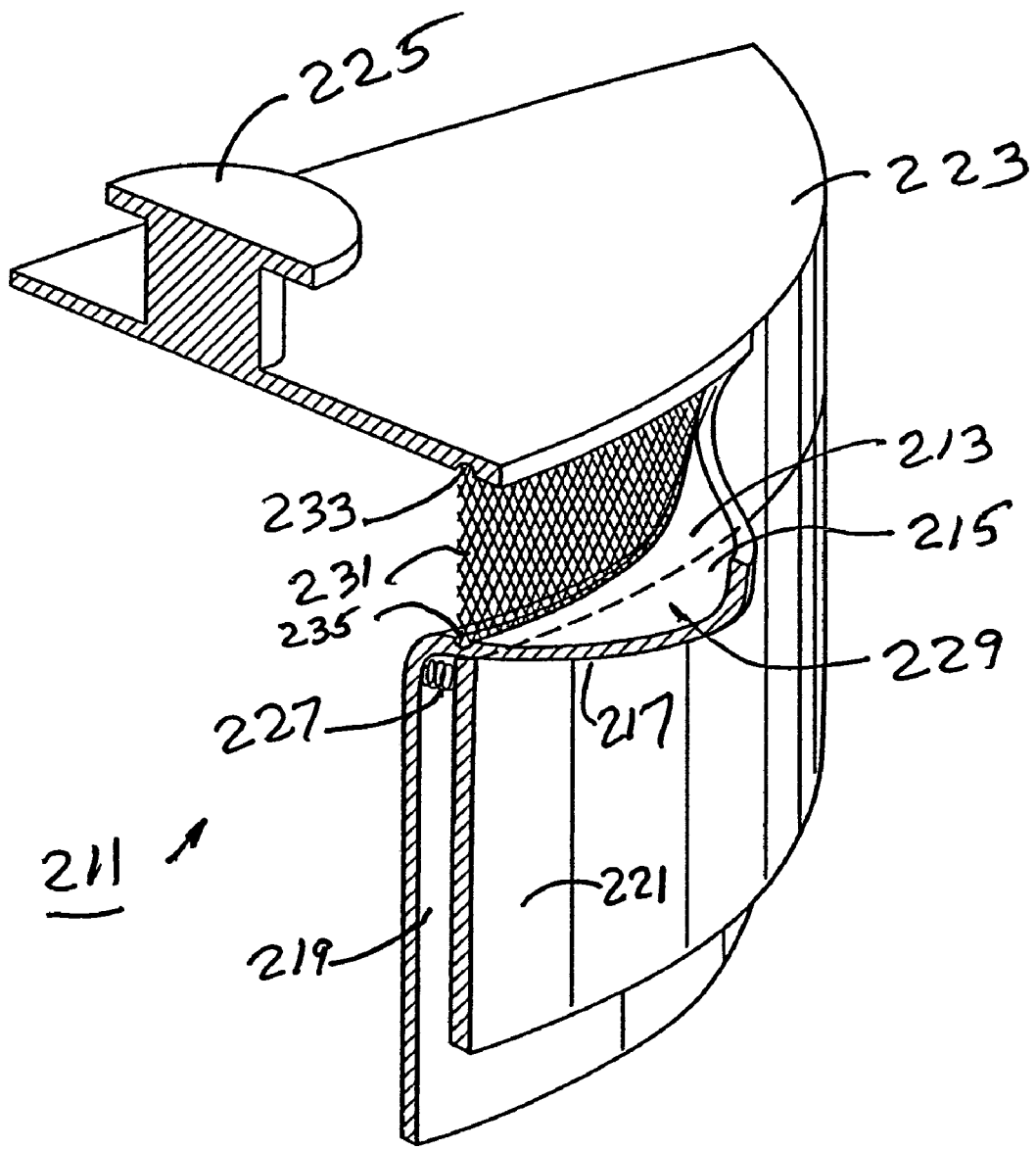
FIG. 7 is an enlarged fragmentary perspective view of a third embodiment of an attachment according to this invention.

Another embodiment of an attachment according to this invention is shown in FIG. 7 and identified by reference numeral 211. Attachment 211 includes a unitary structure having spout 213 which includes a top surface 215 and a bottom surface 217, inner and outer support members 219 and 221, respectively, and a cover 223 which includes a handle 225. Attachment 211 also includes a compression spring 227 for drawing support members 219 and 221 together. As can be seen, spout 213 and cover 223 define a product delivery channel 229.

Attachment 211 is identical to attachment 111 with one notable distinction, the one notable distinction being that attachment 211 includes a mesh filter (e.g. a screen) 231 removably mounted in product delivery channel 229 for serving as a strainer during the pouring process (i.e. restricting large particles from exiting out from spout 213 during the pouring process). As can be seen, mesh filter 231 is mounted within a groove 233 on the bottom surface 235 of cover 223 and a groove 237 on the top surface 215 of spout 213. As can be appreciated, when straining is needed during a pouring process, filter 231 is mounted inside product delivery channel 229 and when straining is not necessary or desired, filter 231 is easily removed from product delivery channel 229.

The embodiments shown in the present invention are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. An attachment for a cookware container for use in the preparation, mixing and cooking of food products, the cookware container comprising a bottom surface and a sidewall, the sidewall having an inner surface and an outer surface, the attachment comprising:
   (a) inner and outer support members for removably mounting the attachment on the sidewall of the cookware container, one support member on each side of the sidewall,
   (b) a spout extending laterally outward from said inner and outer support members, said spout being substantially narrow and concave so as to enable food products retained within the cookware container to be poured out as a narrow, controlled stream, said spout including a top surface; and
   (c) a cover fixed relative to the spout and extending partially across the top surface of the spout, the cover and the spout together defining a product delivery channel.

2. The attachment as claimed in claim 1 wherein each of the support members includes a fixed end, a free end, an inner surface and an outer surface.

3. The attachment as claimed in claim 2 wherein, with the attachment mounted on the sidewall of the container, the inner support member is configured to substantially conform against and frictionally engage the inner surface of the sidewall.

4. The attachment as claimed in claim 3 wherein, with the attachment mounted on the sidewall of the container, the outer support member is configured to substantially conform against and frictionally engage the outer surface of the sidewall.

5. The attachment as claimed in claim 4 wherein each of the support members has a curved contour along its length.

6. The attachment as claimed in claim 5 wherein the inner and outer support members, the spout and the cover are a unitary device.

7. The attachment as claimed in claim 6 wherein the unitary device is constructed of a flexible material.

8. The attachment as claimed in claim 6 wherein the cover is shaped to include a top surface having formed therein a knob-like handle.

9. The attachment as claimed in claim 4 further comprising a mechanical device separate from and coupled between said pair of support members for adjusting the spacing between the free ends of the inner and outer support members.

10. The attachment as claimed in claim 9 wherein said mechanical device is in the form of a compression spring which resiliently draws the inner and outer support members towards one another.

11. The attachment as claimed in claim 10 wherein one end of the compression spring is fixedly mounted in the inner support member and the other end of the compression spring is fixedly mounted in the outer support member.

12. The attachment as claimed in claim 8 further comprising a mesh filter removably mounted within the product delivery channel between the cover and the snout for serving as a strainer.

* * * * *